United States Patent [19]
Douillet

[11] Patent Number: 4,778,161
[45] Date of Patent: Oct. 18, 1988

[54] DEVICE FOR SECURING A SPRING ON A ROD

[75] Inventor: Christian Douillet, Puteaux, France

[73] Assignee: Bendix France, Drancy, France

[21] Appl. No.: 4,711

[22] Filed: Jan. 20, 1987

[30] Foreign Application Priority Data

Jan. 22, 1986 [FR] France ................................ 86 00882

[51] Int. Cl.$^4$ .................................................. F16F 1/12
[52] U.S. Cl. ...................................... 267/179; 24/625;
403/289
[58] Field of Search ............... 267/179, 169, 170, 166;
24/625; 403/10, 289

[56] References Cited

U.S. PATENT DOCUMENTS

| | | | |
|---|---|---|---|
| 1,095,641 | 5/1914 | Johnson | 267/179 X |
| 1,194,336 | 8/1916 | Keim | 267/170 X |
| 1,588,471 | 6/1926 | Bezkorowajnyi | 267/74 |
| 1,665,762 | 4/1928 | Waream | 267/179 X |
| 2,797,937 | 7/1957 | Frishof | 267/167 X |
| 3,010,743 | 11/1961 | Bengtson, Jr. | 403/10 |
| 3,018,535 | 1/1962 | Griffin | 24/625 |
| 3,441,049 | 4/1969 | Caparone et al. | 267/166 X |
| 4,521,005 | 6/1985 | Calderoni | 267/179 |

FOREIGN PATENT DOCUMENTS

| | | | |
|---|---|---|---|
| 1326117 | 3/1963 | France . | |
| 2563588 | 10/1985 | France . | |
| 196057 | 5/1965 | Sweden | 267/179 |
| 394242 | 6/1933 | United Kingdom | 267/166 |
| 540395 | 10/1941 | United Kingdom | 24/625 |

Primary Examiner—George E. A. Halvosa
Attorney, Agent, or Firm—Larry J. Palguta; Ken C. Decker

[57] ABSTRACT

Securing device for concentrically mounting a helical spring on a rod having a transverse abutment surface and a groove, the securing device being elastic and capable of being mounted on the rod and comprising a part intended to be received in the groove and an inclined surface forming an apex which, when the securing device is mounted on the rod, defines a point at a maximum distance from a longitudinal axis of the rod and is located at a predetermined distance from the abutment surface, the spring having an internal radius less than the maximum distance and being made from a substantially cylindrical wire, the radius of which is less than the predetermined distance.

4 Claims, 1 Drawing Sheet

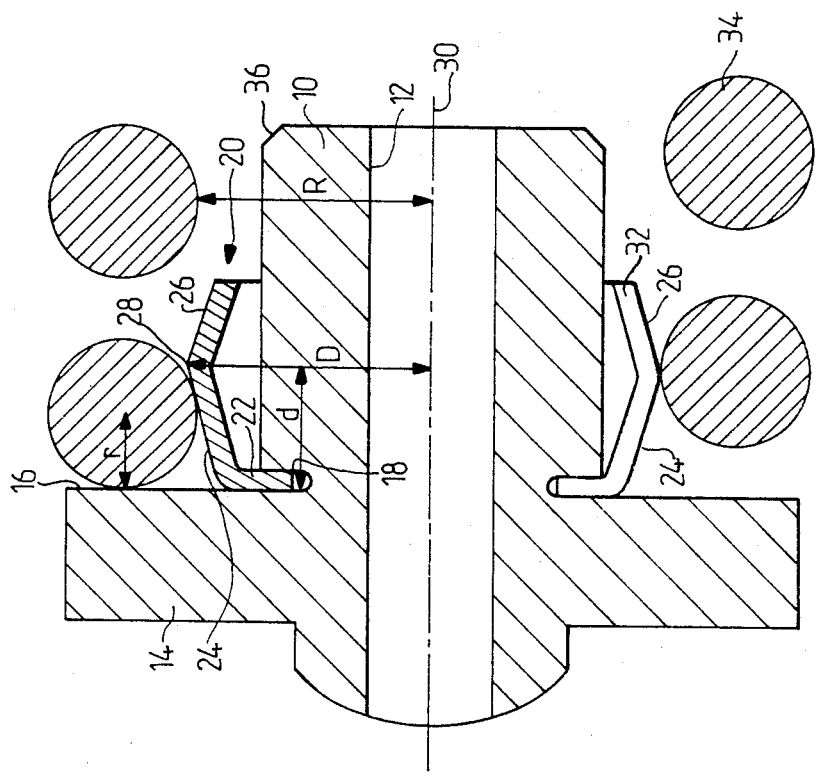

DEVICE FOR SECURING A SPRING ON A ROD

The present invention relates to a device for securing a spring on a rod.

In certain applications, particularly in connection with brake master cylinders, it is desirable to secure one end of a spring onto a member, for example a metal rod, so as to form a preassembled unit from these two components, thereby facilitating their assembly in a more complex unit.

According to the present invention there is provided a securing device for concentrically mounting a helical spring on a rod having a transverse abutment surface and a groove, the securing device being elastic and capable of being mounted on the rod and comprising a part intended to be received in the groove and an inclined surface forming an apex which, when the securing device is mounted on the rod, defines a point at a maximum distance from a longitudinal axis of the rod and is located at a predetermined distance from the abutment surface, the spring having an internal radius less than the maximum distance and being made from a substantially cylindrical wire, the radius of which is less than the predetermined distance.

The invention will now be described by way of example with reference to the accompanying drawing in which the sole FIGURE is a longitudinal section of a device for securing a spring on a rod.

As shown in the FIGURE, a rod 10, which is for example cylindrical and which, in the example shown, has a longitudinal bore 12, comprises a transversely extending part 14 forming an abutment surface 16. The rod 10 has, in addition, an inwardly extending groove 18 in the immediate vicinity of the surface 16. A securing device 20, which is for example substantially cup-shaped, comprises a radial part 22 dimensioned so as to be able to be received in the groove 18. The securing device 20 comprises, in addition, a first and a second inclined annular surface 24, 26, the dihedral 28 of which defines an apex at a maximum distance D from the axis 30 of the bore 12. The securing device 20 is made of resilient metal, for example the device is provided with a longitudinal slot 32, which enables it to expand and/or contract radially. A helical spring 34, intended to be mounted on the rod 10 by means of the securing device 20, has an internal radius R and is formed from a cylindrical wire, the radius of which is r. The distance d between the dihedral 28 and the abutment surface 16 is greater than the radius r of the wire of the spring 34.

Mounting of the device thus described is performed as follows. The securing device 20 is mounted on the rod from the right-hand end (when viewing the drawings) which has a chamfered surface 36 serving to assist radial expansion of the device 20. The radial part 22 of the securing device 20 is then brought into abutment against the surface 16 of the part 14, the radial part 22 thus entering elastically (via a snap-fit) inside the groove 18. The helical spring 34 is then force-fitted onto the securing device 20, the slot 32 allowing the latter to contract radially, the distance D being greater than the internal radius R of the spring 34. Once the end spiral of the spring 34 has passed over the apex of the dihedral 28 (via a resilient or snap-fit), the securing device 20 resumes the position shown in the FIGURE. The first inclined surface 24 thus serves to retain the spring 34 on the rod 10.

I claim:

1. A securing device mounting concentrically a helical spring on a rod having a transverse abutment surface and an adjacent groove disposed in the radius of the rod, the groove being continuous and extending once about the circumference of the rod and adjacent the abutment surface, the device substantially cup-shaped with opposing longitudinal ends having a longitudinal through opening through which extends said rod, the securing device being resilient and mounted on the rod and comprising a radial flange part received by snap-fitting in the groove and a first inclined surface forming an apex which, with the securing device mounted on the rod, defines a point at a maximum distance from a longitudinal axis of the rod and the point located at a predetermined distance from the abutment surface, the spring having an internal radius less than the maximum distance and formed from a substantially cylindrical wire, the radius of the wire less than the predetermined distance, the first inclined surface and a second inclined surface connected therewith being substantially annular, the device having at least one longitudinal slot in a radially peripheral portion thereof to provide said resiliency, and the spring mounted by snap-fitting about the device which is mounted on the rod so that the apex maintains a portion of the wire in engagement with the abutment surface.

2. The device according to claim 1, characterized in that the second inclined surface forms a dihedral with the first inclined surface, the dihedral forming the apex.

3. The device according to claim 1, characterized in that an end of the rod opposite the abutment surface has a chamfered surface.

4. The device according to claim 1, wherein the rod includes a longitudinal through opening.

* * * * *